United States Patent [19]

Nakano et al.

[11] E Patent Number: Re. 33,538

[45] Reissued Date of Patent: Feb. 19, 1991

[54] VALVE OPERATION CONTROL DEVICE FOR INTERNAL COMBUSTION ENGINES

[75] Inventors: Yoshikatsu Nakano, Kawagoe; Masaaki Matsuura, Tokyo, both of Japan

[73] Assignee: Honda Giken Kogyo Kabushiki Kaisha, Tokyo, Japan

[21] Appl. No.: 315,195

[22] Filed: Feb. 27, 1989

Related U.S. Patent Documents

Reissue of:

[64] Patent No.: 4,535,732
Issued: Aug. 20, 1985
Appl. No.: 624,572
Filed: Jun. 26, 1984

U.S. Applications:

[63] Continuation of Ser. No. 87,629, Aug. 20, 1987, abandoned.

[30] Foreign Application Priority Data

Jun. 29, 1983 [JP] Japan ..... 58-117826
Jun. 29, 1983 [JP] Japan ..... 58-117827
Jun. 29, 1983 [JP] Japan ..... 58-117828
Jun. 29, 1983 [JP] Japan ..... 58-117829

[51] Int. Cl.[5] ..... F01L 1/00
[52] U.S. Cl. ..... 123/90.16; 123/198 F
[58] Field of Search ..... 123/90.15, 90.16, 90.17, 123/90.27, 90.46, 198 F, 308, 315, 432

[56] References Cited

U.S. PATENT DOCUMENTS 4,153,033 5/1979 Iizuka ..... 123/198 F
4,253,434 3/1981 Takizawa et al. ..... 123/90.16
4,285,310 8/1981 Takizawa et al. ..... 123/90.16
4,353,334 10/1982 Neitz ..... 123/90.16
4,354,460 10/1982 Mae et al. ..... 123/90.16
4,404,937 9/1983 Leitermann ..... 123/90.16
4,423,709 1/1984 Arrieta ..... 123/198 F
4,442,806 4/1984 Matsuura et al. ..... 123/90.16
4,449,495 5/1984 Fiala ..... 123/198 F
4,469,061 9/1984 Ajiki et al. ..... 123/90.16
4,480,617 11/1984 Nakano et al. ..... 123/432
4,494,502 1/1985 Endo et al. ..... 123/198 F

FOREIGN PATENT DOCUMENTS 2069059 8/1981 United Kingdom ..... 123/198 F

*Primary Examiner*—Andrew M. Dolinar
*Assistant Examiner*—M. Macy
*Attorney, Agent, or Firm*—Lyon & Lyon

[57] ABSTRACT

A valve [disabling] *operation control* device for use in an internal combustion engine having inlet valve means, exhaust valve means, at least one of which comprises a plurality of valves. Disabling means selectively holds the at least one of the inlet valve means and the exhaust valve means in a first state wherein part of the valves thereof are inoperative, and in a second state wherein all the valves thereof are operative for alternate closing and opening actions. Transmission state detecting means detects whether power transmission means of the engine is in a connected state wherein power transmission between the engine output shaft and a load on the engine is allowed, and is a disconnected state wherein the power transmission is inhibited. Control means is responsive to an output from the detecting means to cause the disabling means to hold the at least one of the inlet valve means and the exhaust valve means in the first state when the power transmission means in the disconnected state, irrespective of the rotational speed of the engine.

32 Claims, 6 Drawing Sheets

VALVE OPERATION CONTROL DEVICE FOR INTERNAL COMBUSTION ENGINES

Matter enclosed in heavy brackets [ ] appears in the original patent but forms no part of this reissue specification; matter printed in italics indicates the additions made by reissue.

*This application is a continuation of application Ser. No. 07/087,629, filed Aug. 20, 1987, now abandoned, which is a reissue of 06/624,572, filed Jun. 26, 1984, U.S. Pat. No. 4,535,732.*

BACKGROUND OF THE INVENTION

This invention relates to a valve [disabling] *operation control* device for use in an internal combustion engine, and more particularly to control means for such valve *operation control device, hereinafter sometimes referred to as a valve* disabling device.

High output type internal combustion engines include a type equipped with a plurality of inlet valves and/or exhaust valves at each of the cylinders (hereinafter called "the multi-valve engine"). In the multi-valve engine, the communication passageway between the intake passage and/or the exhaust passage and the combustion chamber in each of the cylinders, which is alternately closed and opened by the inlet valves and/or the exhaust valves (hereinafter merely called "the valves" unless otherwise specified), has a relatively large total effective area of section so as to permit large quantities of a mixture and/or exhaust gases to be supplied into and/or emitted from the engine cylinder, thereby achieving high speed and high output operation of the engine.

However, the multi-valve engine suffers from a degradation in the engine output during operation in a low speed region. This is due to reduced charging efficiency which is caused by sucking of a reduced quantity of intake air into the combustion chamber through the above communication passageway having a large total effective area of section during engine operation in such low speed region, or caused by direct passing of intake air from the intake port to the exhaust port, which generally takes place during engine operation in such low speed region, and more frequently in the multi-valve engine in which the total sectional area of the inlet port or the exahust port is large. In other words, while in internal combustion engines in general, the suction of a mixture into an engine cylinder is effected due to the inertia of intake air as well as a vacuum developed in the engine cylinder during the suction stroke, the inertia of intake air is small and direct passing of intake air from the inlet port to the exhaust port takes place while the engine is operating in a low speed region, resulting in a degradation in the engine output.

To overcome such disadvantages, it has generally be employed to disable or render inoperative part of the inlet valves and/or the exhaust valves during engine operation in a low speed region to keep same in a closed position, or to design the communication passageway between the intake passage and/or the exhaust passageway and the combustion chamber to be small in sectional area so as to obtain sufficient inertia of intake air or reduce the possibility or rate of direct passing of intake air from the inlet port to the exhaust port even during engine operation in a low speed region.

A curve of the rotational speed-output characteristic of the multi-valve engine obtained when part of the valves are rendered inoperative crosses with a curve of the same characteristic obtained when all the valves are operative, at a particular rotational speed N1 of the engine. The former is superior to the latter in an engine speed region lower than the speed N1, whereas the latter is superior to the former in an engine speed region higher than the particular speed N1. This rotational speed N1 remains nearly constant even with a change in the valve opening $\theta$th of a throttle valve in the intake passage. This fact implies that if the engine is operated with part of the valves inoperative when the engine rotational speed Ne is lower than the speed N1, whereas the engine is operated with all the valves operative when the engine rotational speed Ne is higher than the particular speed N1, as employed by a conventional valve disabling device of this kind, a drop in the engine output can be avoided during engine operation in a low speed region even in the multi-valve engine.

On the other hand, in the event that an engine is operated in a non-loaded condition, for instance, if an engine installed in a vehicle is operated with the clutch in a disengaged state or the transmission in a neutral position whereby no power transmission takes place from the engine output shaft to the driving wheels, no higher engine output is required than one sufficient to permit racing of the engine or mere operation of the throttle valve through an accelerator, to achieve satisfactory engine performance.

In such a non-loaded condition of the engine, it suffices to operate the engine with part of the valves inoperative to maintain stable operation of the engine, even in a high speed region. Further, the engine speed can increase within a very short rise time in response to changeover of the valve disabling device from a state wherein part of the valves are inoperative (hereinafter called "the partial valve inoperative state") to a state wherein all the valves are operative (hereinafter called "the all valve operative state"), during racing of the engine such that the engine rotational speed Ne at which the changeover is actually effected is higher than the particular speed N1 by certain rpm $\alpha$, even if the valve disabling device is adapted to effect such changeover at the particular engine speed N1, causing a sudden increase in the engine output, which in turn leads to a large mechanical shock applied to engine component parts as well as to the valve disabling device.

Moreover, as the throttle valve opening $\theta$th decreases, the absolute quantity of intake air decreases due to the throttling action of the throttle valve. It has been found that as a consequence of this, when the throttle valve opening $\theta$th is less than a predetermined value equal, e.g. to 1/16 times as large as the maximum valve opening, a superior engine output characteristic is obtained in the partial valve inoperative state to one obtained in the all valve operative state, throughout the whole engine speed region. Particularly, in an engine for vehicles, the capability of maintaining the operation of the engine with a high gear ratio of the transmission (TOP SLOW) at the lowest possible rotational speed is a barometer for the driveability of the vehicle and the operational flexibility of the engine. To this end, it is important that the engine should exhibit a satisfactory output characteristic when the throttle valve opening $\theta$th is reduced to a very small value. Therefore, it is desirable to operate the engine in the partial valve inoperative state when the throttle valve assumes a small valve opening, and in a low engine speed region in particular.

In addition, if the valve disabling device for effecting changeover between the all valve operative state and the partial valve inoperative state is formed by an oil hydraulic means which is incorporated in the engine oil circulation system of the engine to utilize engine oil as operating fluid, when the engine oil is low in temperature and accordingly high in viscosity, the engine oil within the valve disabling device has reduced fluidity, which can degrade the responsiveness of the valve disabling device. As a consequence, assuming that the aforementioned particular rotational speed N1 is set at 2,000 rpm for instance, the changeover from the partial valve inoperative state to the all valve operative state will actually be effected at an engine rotational speed of 2,000 rpm plus rpm $\beta$, the rpm corresponding to an increase in the viscosity of the engine oil. If an engine equipped with such valve disabling device is installed in a vehicle, there can occur a sudden change in the engine output at the time of changeover operation of the valve disabling device, creating an unpleasant feeling to the driver or passengers.

SUMMARY OF THE INVENTION

It is an *object of the invention to provide a valve operation control that is effective to sense one or more engine operating conditions and to maintain the flow of mixture and/or exhaust gas to or from the engine cylinder at a selected level in response to the sensed existence or non-existence of a particular engine operating condition or of a concurrence of plural conditions thereof.*

*It is one* object of the invention to provide a valve *operation control or* or disabling device which is adapted to hold part of the valves inoperative when the power transmission means of the engine is in a disengaged state, thereby avoiding mechanical shocks upon the same device as well as upon component parts of the engine due to a response lag of the changeover action of the device between the partial valve inoperative state and the all valve operative state, and prolonging the lives of the device and the engine component parts.

It is a further object of the invention to provide a valve disabling device which is of the oil hydraulic type and adapting to hold part of the valves inoperative when the temperature of its operating fluid is low, thereby avoiding mechanical shocks upon the same device as well as upon component parts of the engine due to a response lag of the above changeover action of the device, and prolonging the lives of the device and the engine component parts.

It is another object of the invention to provide a valve disabling device which is adapted to hold part of the valves inoperative when the throttle valve of the engine assumes a small valve opening, thereby enhancing the engine output characteristic in a low speed region in particular.

The present invention provides a valve disabling device for use in an internal combustion engine having inlet valve means and exhaust valve means, at least one of which comprises a plurality of valves, an output shaft, and power transmission means for selectively establishing and interrupting power transmission between the output shaft and a load on the engine.

Disabling means selectively holds the at least one of the inlet valve means and the exhaust valve means in a first state wherein part of the valves thereof are inoperative, and in a second state wherein all the valves thereof are operative for alternate closing and opening actions. Transmission state detecting means detects whether the power transmission means of the engine is in a connected state wherein the power transmission is allowed, and in a disconnected state wherein the power transmission is inhibited. Control means is responsive to an output from the detecting means to cause the disabling means to hold the at least one of the inlet valve means and the exhaust valve means in the first state when the power transmission means in the disconnected state, irrespective of the rotational speed of the engine.

Further, the valve disabling device includes engine speed sensor means for sensing the rotational speed of the engine, and at least one of temperature sensor means for sensing the temperature of the operating oil and throttle valve opening sensor means for sensing the valve opening of a throttle valve of the engine. The control means is responsive to an output from the engine speed sensor means, as well as to at least one of an output from the temperature sensor means, an output from the throttle valve opening sensor means, and the output from the transmission state detecting means, for controlling the supply of the operating oil from operating oil supply means to the disabling means in the following manner: The disabling means holds the at least one of the inlet valve means and the exhaust valve means in the second state when the rotational speed of the engine is higher than a predetermined value and at the same time at least one of the conditions is satisfied that the temperature of the operating oil is higher than a predetermined value, the throttle valve opening is larger than a predetermined value, and the power transmission is in the connected state. On the other hand, the disabling means holds the at least one of the inlet valve means and the exhaust valve means in the first state when either of the conditions is satisfied that the rotational speed of the engine is lower than the predetermined value thereof, the temperature of the operating oil is lower than the predetermined value thereof, the throttle valve opening is smaller than the predetermined value thereof, and the power transmission means is in the disconnected state.

The above and other objects, features and advantages of the invention will be more apparent from the ensuing detailed description taken in conjunction with the accompanying drawings.

DETAILED DESCRIPTION

The invention will now be described in detail with reference to the drawings.

Figure 1:
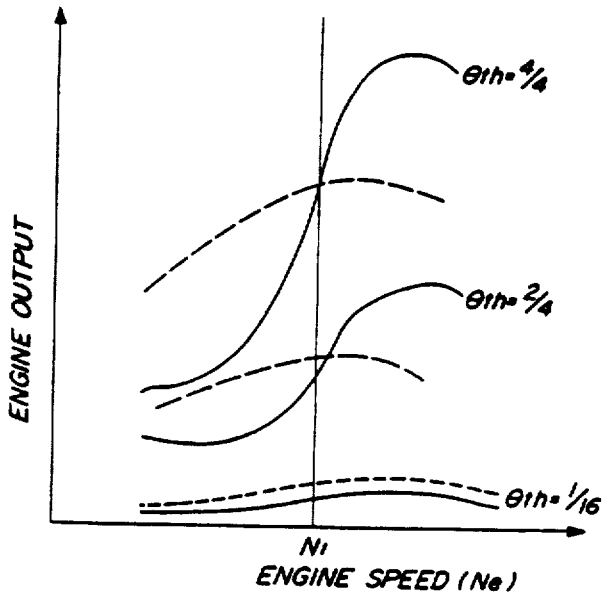
FIG. 1 is a graph showing typical examples of the rotational speed-output characteristic of an internal combustion engine obtained in the all valve operative state and in the partial valve inoperative state at three different values of the throttle valve opening.

Referring first to FIG. 1, there are shown typical examples of the rotational speed-output characteristic of an internal combustion engine equipped with a plurality of the valves, and a valve disabling device for holding part of the valves in closed positions thereof. In the graph of FIG. 1, three pairs of curves of the rotational speed-output characteristic are shown in solid lines and broken lines obtained, respectively, in the all valve operative state and in the partial valve inoperative state, at three different values of the throttle valve opening $\theta$th (=1/16, 2/4, and 4/4). As will be learned from the graph, when the throttle valve assumes a valve opening larger than a half open position ($\theta$th=2/4), a curve of the characteristic in the all valve operative state and a curve of same in the partial valve operative state of the same pair crosses with each other at a particular rotational speed N1 which is nearly constant, irrespective of the throttle valve opening $\theta$th. It should also be noted that when the engine speed Ne is higher than the particular speed N1, the engine output is larger when it is operating in the all valve operative state than when it is operating in the partial valve inoperative state, whereas when the engine speed Ne is smaller than the particular speed N1, the engine output is larger when it is operating in the partial valve inoperative state than when it is operating in the all valve operative state.

However, if by the use of the conventional valve disabling device responsive to the engine rotational speed alone the engine is operated in the partial valve inoperative state in a low speed region, and in the all valve operative state in a high speed region, there occurs the aforementioned response lag due to sudden rise of the engine speed and increased viscosity of the engine oil, respectively, at no-load operation of the engine and at low temperature operation of the engine, that is, actual changeover between the partial valve inoperative state and the all valve operative state does not take place exactly at the particular engine speed N1, causing a sudden change in the engine output upon the changeover, which can lead to shortened effective lives of the valve disabling device and engine component parts and spoil the driveability of the vehicle on which the engine is installed. Moreover, as will be noted from the graph of FIG. 1, when the throttle valve opening $\theta$th is less than 1/16 times as large as the maximum valve opening, also in an engine speed region higher than the particular speed N1, the engine output is smaller when the engine is operating in the all valve operative state than when it is operating in the partial valve inoperative state. Therefore, according to the conventional valve disabling device which operates the engine in the all valve operative state in the higher engine speed region, it is difficult to achieve desired driveability of the vehicle in the higher engine speed region at a small throttle valve opening.

Figure 2:
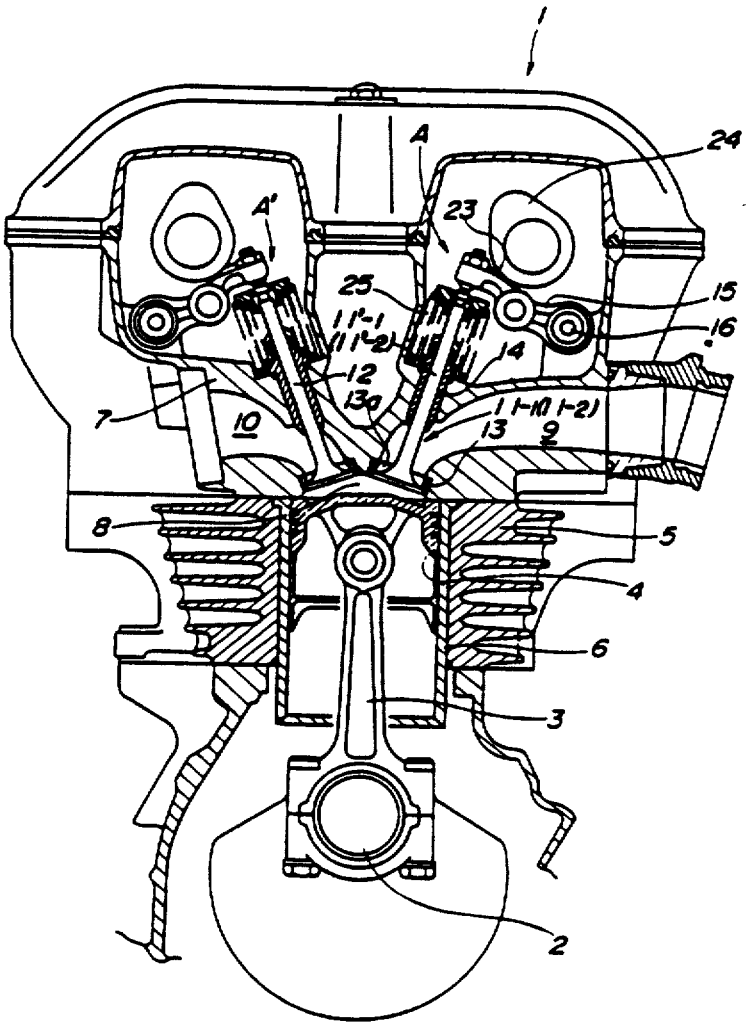
FIG. 2 is a fragmentary longitudinal sectional view of an internal combustion engine equipped with a valve disabling device according to a first embodiment of the invention.

Referring next to FIGS. 2 through 9, there is shown a first embodiment of the present invention, which is applied to an internal combustion engine of the four cylinder type and equipped with a total of sixteen inlet valves and exhaust valves. In FIG. 2, reference numeral 1 generally designates the engine of the above-mentioned type, in which a piston 4 is drivingly coupled to a crankshaft 2 by means of a connection rod 3, and is slidably fitted within a cylinder barrel 6 disposed in a cylinder block 5 (only one of the cylinders of the engine is shown in FIG. 2). A cylinder head 7 is located on an upper part of the cylinder block 5 and formed therein with an intake passage 9 and an exhaust passage 10 communicating with a combustion chamber 8 defined between the piston 4 and the cylinder head 7 within the cylinder. The intake passage 9 communicates with a downstream portion of a carburetor, not shown, in which a throttle valve, not shown, is arranged therein, while the exhaust passage 10 is connected to an exhaust pipe, not shown.

Figure 4:
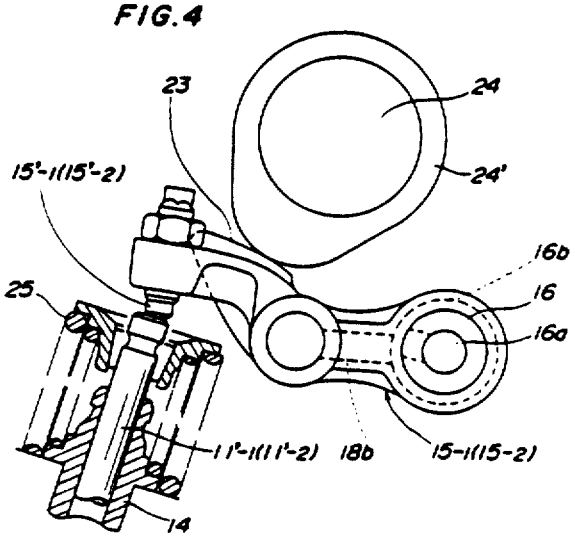
FIG. 4 is a fragmentary side view, partly in section, of the same inlet side operating section in the all valve operative state.

An end of the intake passage 9 opening in the combustion chamber 8 is provided with two inlet valves 11 (11-1, 11-2), only one of which is shown, arranged in juxaposition, to be closed and opened thereby. That is, two valves seats 13 are arranged in juxtaposition at the open end of the intake passage 9, and each of the inlet valves 11 is seatably fitted through an opening 13a of a corresponding one of the valve seats 13. Each of the inlet valves 11-1, 11-2 has its valve stem 11'-1, 11'-2 slidably fitted through a corresponding one of inlet valve guides 14, only one of which is shown, with its tip disposed in urging contact with an opposed end 15'-1, 15'-2 of a corresponding one of two rocker arms 15'-1, 15-2, as best shown in FIG. 4. The two rocker arms 15-1, 15-2 are juxtaposed with each other and pivotally journalled by a common inlet rocker arm shaft 16. One of the rocker arms, i.e. the rocker arm 15-1 is disposed in slidable contact with an inlet cam 24' of a camshaft 24 to be driven thereby, while the other rocker arm 15-2 is operated by an inlet operating means A of the valve desabling device, hereinafter described, to be selectively drivingly connected to the rocker arm 15-1 for motion in unison therewith or disconnected therefrom to be inoperative.

In the same manner as the inlet valves 11, two exhaust valves 12, only one of which is shown, are arranged in juxtaposition at an end of the exhaust passage 10 opening in the combustion chamber 8 to close and open same. One of the exhaust valves 12 is driven directly by an exhaust cam, not shown, of the camshaft 24, and the other is operated by an exhaust operating means A' of the valve disabling device to be selectively drivingly connected to the first-mentioned exhaust valve 12 for motion in unison therewith or disconnected therefrom to be inoperative.

As noted above, the inlet valves 11 and the exhaust valves 12 have substantially the same valve mechanism, and accordingly the inlet and exhaust operating means A, A' for these valves are substantially identical in structure with each other. Therefore, description given below is only directed to the inlet operating means A.

The two rocker arms 15-1, 15-2 are formed therein with continuous bores 18 and 22 and axially aligned with each other, in which is slidably received a piston 17. A back pressure chamber 18a is defined in an end portion of the bore 18 on the side of the rocker arm 15-1 which is always operative, by the peripheral wall of the rocker arm 15-1 and an end face of the piston 17 facing the rocker arm 15-1. This back pressure chamber 18a communicates with an oil feeding passage 16a formed in the inlet rocker arm shaft 16 along its axis, through a hole 16b formed through the peripheral wall of the shaft 16, an annular groove 18c formed in the rocker arm 15-1 around the shaft 16, and an oil hole 18b formed in the rocker arm 15-1 and extending between the groove 18c and the back pressure chamber 18a.

Figure 3:
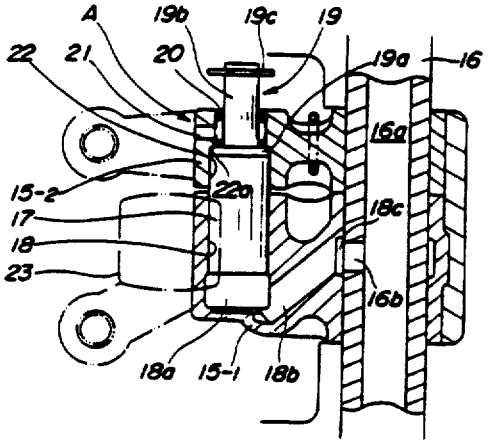
FIG. 3 is a fragmentary horizontal sectional view of an inlet side operating section of the valve disabling device according to the invention in the all valve operative state.

An end face of the piston 17 facing the other rocker arm 15-2, which is to be rendered inoperative or disabled, is disposed in urging contact with an enlarged end 19a of a guide pin 19 axially movably disposed within the rocker arm 15-2 and permanently urged toward the rocker arm 15-1 by the force of a coiled spring 20 fitted around a main portion 19b of the guide pin 19. In FIG. 3, reference numeral 21 designates an air-escape hole.

The position of the inlet operating means A shown in FIGS. 3 and 4 corresponds to the all valve operative state, wherein pressurized oil (operating oil) in the back pressure chamber 18a supplied from the oil feeding passage 16a through the oil holes 16b, 18b urgingly biases the piston 17 against the force of the spring 20, in a position where it is partly fitted into the guide bore 22 formed in the disabling rocker arm 15-2 as well. With this position of the piston 17, the two rocker arms 15-1, 15-2 are drivingly coupled together for motion in unison with each other. A cam slipper 23 formed on an upper surface of the always operating rocker arm 15-1 is permanently disposed in slidable contact with a camming surface on the inlet cam 24' by the force of a valve spring 25. Thus, as the crankshaft 2 rotates, the two coupled rocker arms 15-1, 15-2 make a unitary rocking motion about the shaft 16 so that the two inlet valves 11-1, 11-2 in urging contact with the respective rocker arms 15-1, 15-2 are forced to make concurrent valving or closing and opening motions to alternately interrupt and establish the communication between the intake passage 9 and the combustion chamber 8.

Figure 5:
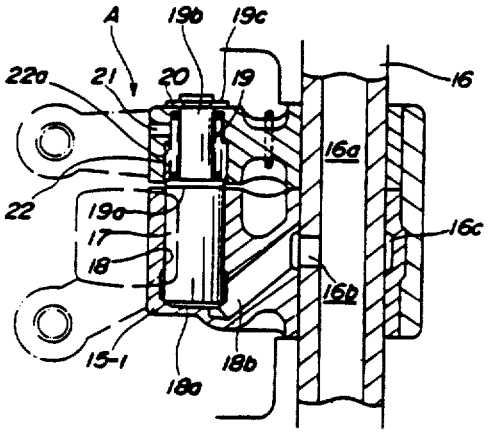
FIG. 5 is a view similar to FIG. 3, showing the inlet side operating section in the partial valve inoperative state.
Figure 6:
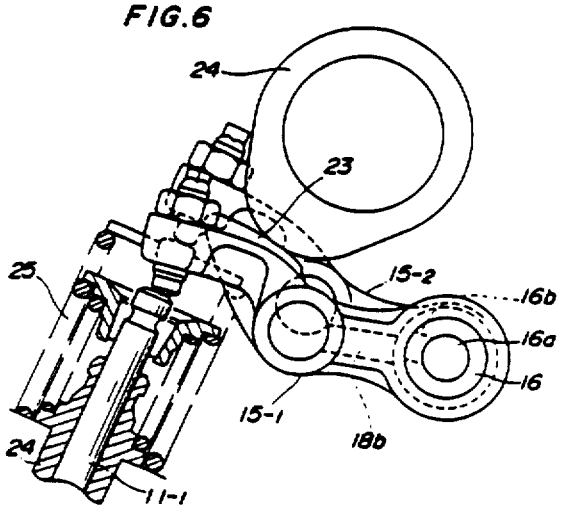
FIG. 6 is a view similar to FIG. 4, showing the inlet side operating section in the partial valve inoperative state.

FIGS. 5 and 6 show the inlet operating means A in a position corresponding to the partial valve inoperative state. In this position, the pressure oil in the oil feeding passage 16a is caused to decrease so that the piston 17 is moved back toward the guide bore 18 in the always operating rocker arm 15-1 by the force of the spring 20 to release the two rocker arms 15-1, 15-2 from their driving connection. In this released position of the rocker arms, no force that is exerted upon the always operating rocker arm 15-1 by the rotating cam 24' is transmitted to the disabling rocker arm 15-2. Accordingly, the communication between the intake passage 9 and the combustion chamber 8 is alternately closed and opened by the allways operating rocker arm 15-1 alone, while simultanously the other rocker arm 15-2 remains inoperative. That is, only a corresponding one of the openings 13a of the two valve seats 13 at each of the engine cylinder is alternately closed and opened.

Figure 7:
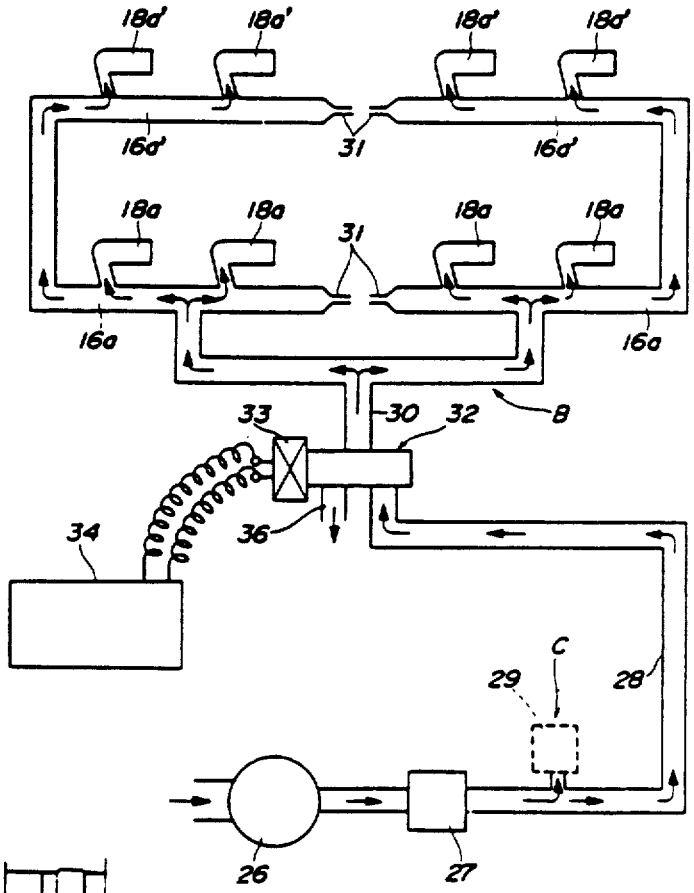
FIG. 7 is a schematic circuit diagram of an oil circuit of an operating oil supply control means of the valve disabling device according to the first embodiment of the invention.

FIG. 7 shows an operating oil supply control means B forming part of the valve disabling device, for actuating the inlet and exhaust operating means A, A', and also shows an engine oil lubricating system C of the engine. Operating oil or engine oil is pumped by an oil pump 26, delivered into an oil feeding passage 28 after being filtrated by a filter 27, and then fed to various sliding and rolling parts 29 of the engine to lubricate same. Part of the oil in the oil feeding passage 28 is supplied through an oil feeding passage 30 to the oil feeding passage 16a in the inlet rocker arm shaft 16 communicating with the back pressure chambers 18a, which are four in number, of the inlet operating means A, as well as to another oil feeding passage 16a' communicating with back pressure chambers 18a', which are four in number, of the exhaust operating means A'. Each of the oil feeding passages 16a, 16a' has one end 31 thereof shaped in the form of an orifice, through which excess oil is discharged into the cylinder head 7.

An solenoid controlled valve 32 is arranged between the oil feeding passages 28, 30, and has its solenoid 33 electrically connected to a control circuit 34. The control circuit 34 performs on-off control of electric current to be supplied to the solenoid 33 in response to a signal from a clutch switch 50 or a neutral position switch 48 (FIG. 9), to control the flow of oil between the two passages 28, 30, in a manner hereinafter described in detail.

Figure 8:
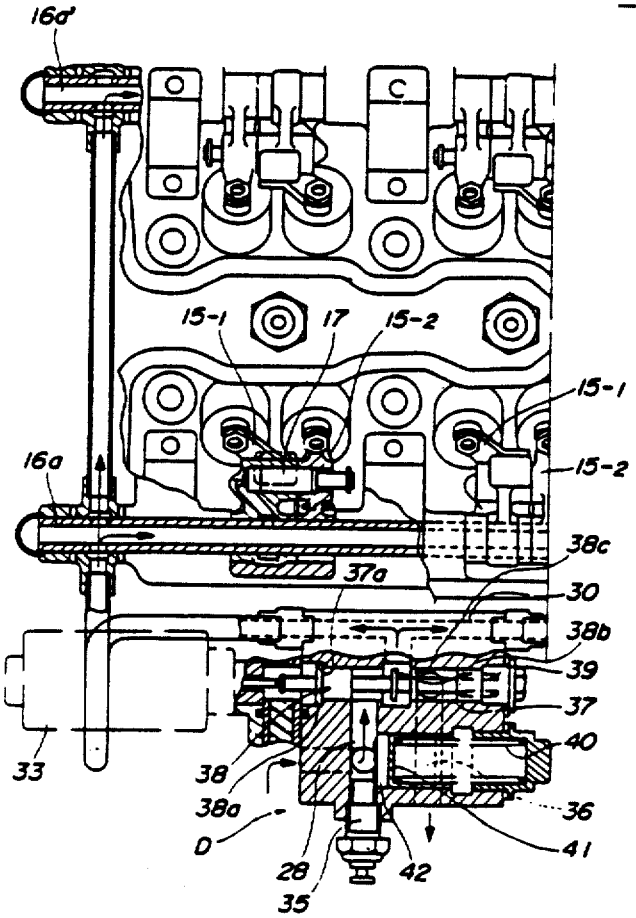
FIG. 8 is a top plan view, partly in section, of a valve mechanism and its peripheral parts of the control means of FIG. 7.

FIG. 8 illustrates the valve mechanism of the operating oil supply control means B and its peripheral parts. In the figure, a coupling member D is fixed on the cylinder head 7 and is formed therein with the above-mentioned oil feeding passages 30, 28, a drain hole 36, and a valve bore 37 located between them. The oil feeding passage 28 opens in the valve bore 37 at a location closer to the valve 32 by a distance substantially equal to the maximum stroke of the spool with respect to an open end of the oil feeding passage 30 opening in the valve bore 37, while the drain hole 36 opens in the valve bore 37 at a side remote from the valve 32 with respect to the open end of the passage 30. A spool 38 is slidably received within the valve bore 37, with its one end drivingly connected to the solenoid 33 fixed to the coupling member D. A coiled spring 39 is accommodated within the valve bore 37 at the other end of the spool 38 and urges the spool 38 toward the solenoid 33. The spool 38 is constructed and disposed as follows: When the solenoid 33 is energized, the resulting electromagnetic force causes the spool 38 to be moved rightward as viewed in FIG. 8 against the force of the spring 39 whereby a stopper 38a of the spool 38 is displaced into urging contact with a stepped shoulder 37a of the valve bore 37 as in the position illustrated in FIG. 8. This establishes communication between the two passages 28, 30 and simultaneously interrupts the communication between the passage 30 and the drain hole 36 by means of a land 38c of the spool 38. When the solenoid 33 is deenergized, the spool 38 is moved leftward as viewed in FIG. 8 from the illustrated position by the force of the spring 39 so that the communication between the passages 28, 30 is interrupted by means of another land 38b, while simultaneously establishing communication between the passage 30 and the drain hole 36.

Formed in the coupling member D is an accumulator chamber 42 which communicates with one end portion of the oil feeding passage 28 and in which are disposed a coil spring 40 and a hollow piston 41 movable in response to the difference between the force of the spring 40 and oil pressure therein, so as to keep the pressure of operating oil constant.

Figure 9:
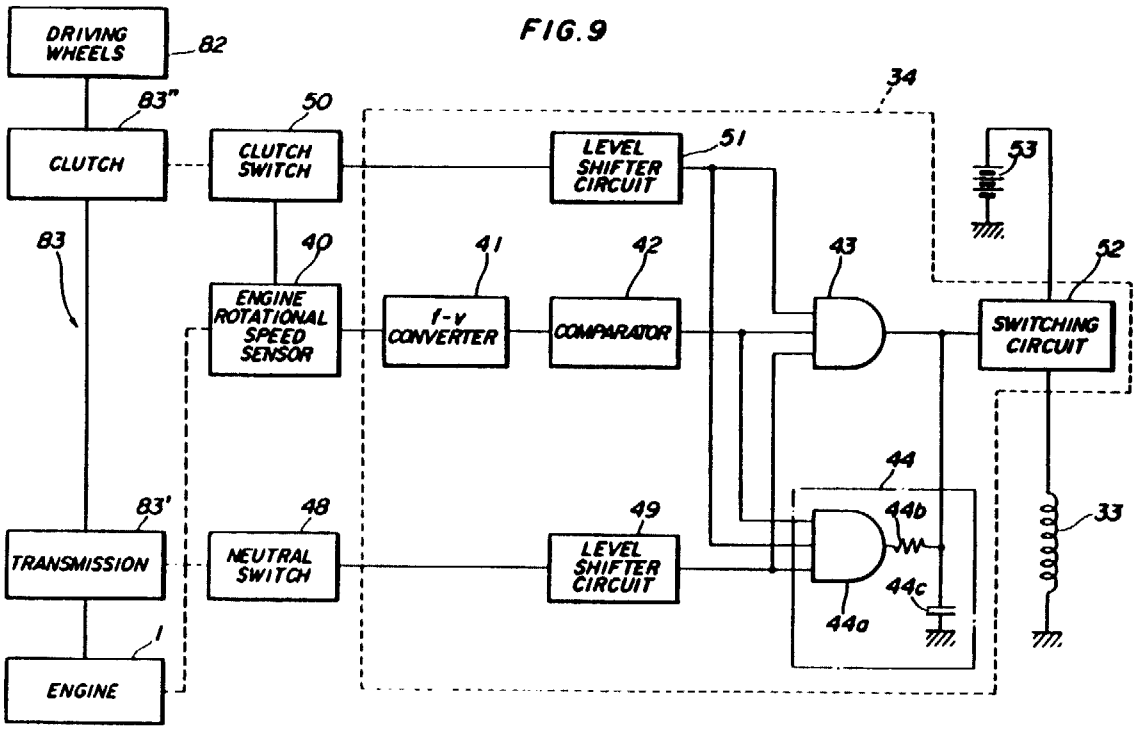
FIG. 9 is a schematic circuit diagram of an electrical control circuit of the valve disabling device according to the first embodiment of the invention.

FIG. 9 shows the interior construction of the control circuit 34 which controls the solenoid 33 of the solenoid controlled valve 32. An engine rotational speed sensor 40 has its output connected to the input of a frequency-to-voltage converter (hereinafter called "f-V converter") 41 which in turn has its output connected to an input terminal of a comparator 42. The comparator 42 has its output connected to a first input terminal of an AND circuit 43 as well as to a first input terminal of a changeover temporary inhibit circuit 44. The engine rotational speed sensor 40 supplies an electrical output signal having a frequency proportional to the rotational speed of the engine 1 to the f-V converter 41, which in turn converts the output signal from the sensor 40 into a voltage VN proportional to the rotational speed of the engine and applies same to the comparator 42. The comparator 42 compares this voltage VN with a predetermined voltage V1 corresponding to a predetermined value of the engine rotational speed (e.g. 2,000 rpm), and when the relationship $VN \geqq V1$ stands, that is, when the engine rotational speed is higher than or equal to the predetermined value, it applies a high level output to the AND circuit 43, while when the relationship $VN < V1$ stands, that is, when the engine rotational speed is lower than the predetermined value, it applies a low level output to the AND circuit 43. As the engine rotational speed sensor 40, a separate or discrete sensor need not be provided. For example, a smoothed voltage obtained from a signal from the ignition device of the engine, which is proportional to the engine rotational speed, may be supplied as an engine speed signal to the comparator 42, instead.

The neutral position switch 48 is connected to the input of a level shifter circuit 49 which has its output connected to a second input terminal of the AND circuit 43 as well as to a second input terminal of the changeover temporary inhibit circuit 44. This neutral position switch 48 is connected to a transmission 83' forming part of power transmission means 83 of the engine for selectively allowing and interrupting transmission of the engine output from the engine to an engine load, e.g. driving wheels 82 of a vehicle in which the engine is installed, and when the transmission 83' is in its neutral position, it generates an on-state signal and applied same to the level shifter circuit 49, which in turn shifts this signal into a low level voltage and applies same to the AND circuit 43. On the other hand, when the neutral position switch 48 is in an off state, that is, when the transmission 83' is in a connected position, the neutral position switch applies an off-state signal to the level shifter circuit 49 which applies a corresponding high level voltage to the AND circuit 43.

The clutch switch 50 is connected to the input of a level shifter circuit 51 which has its output connected to a third input terminal of the AND circuit 43, as well as to a third input terminal of the changeover temporary inhibit circuit 44. The clutch switch 50 generates an on-state signal when a clutch 83" of the power transmission means 83 is in an engaged state, and the level shifter circuit 51 shifts the on-state signal into a high level voltage and applies same to the AND circuit 43. When the clutch 83" is in a disengaged state, the clutch switch 50 applies an off-state signal to the level shifter circuit 51 which in turn shifts the signal into a low level voltage and applies same to the AND circuit 43.

The AND circuit 43 has its output connected to a control terminal of a switching circuit 52 which is formed, e.g. of an analog switch, and is connected between a power source, e.g. a battery 53 and the solenoid 33 of the solenoid controlled valve 32 in FIGS. 7 and 8. When the input signal to the control terminal is at a high level, the switching circuit 52 electrically connects the battery 53 with the solenoid 33 to energize the latter, whereas when the input signal to the control terminal is at a low level, it shuts off the electrical connection between the battery 53 and the solenoid 33 to deenergize the latter.

The changeover temporary inhibit circuit 44, which is supplied with input signals from the comparator 42 and the level shifter circuits 49, 51, has its output connected to the output of the AND circuit 43. In the event that the transmission 83' temporarily assumes its neutral position or the clutch 83" temporarily assumes its disengaged state during shifting action of the transmission while the valve disabling device is in the all valve operative state so that the neutral position switch 48 or the clutch switch 50 temporarily generates an on-state signal or an off-state signal, respectively, to cause the output from the AND circuit 43 to go low, the changeover temporary inhibit circuit 44 applies a high level output voltage to the control terminal of the switching circuit 52 for a predetermined period of time, irrespective of the output from the AND circuit 43. In the illustrated example, the temporary inhibit circuit 44 comprises an AND circuit 44a disposed to be supplied with signals from the comparator 42 and the level shifter circuits 49, 51, a resistance 44b connected to the output of the AND circuit 44a, and a capacitor 44c connected at one end to the output from the AND circuit 43 as well as to the control terminal of the switching circuit 52 and grounded at the other end. With this arrangement, in the event that the neutral switch 48 or the clutch switch 50 temporarily assumes an on position or an off position, respectively, during shifting operation of the transmission and then assumes an off position or an on position, respectively, before the above-mentioned predetermined period of time elapses, the switching circuit 52 is not released from its closed state by virtue of the voltage-holding function of the temporary inhibit circuit 44, to maintain the all valve operative state.

The operation of the valve *operation control or* disabling device constructed as above will now be described. When the input signals applied to the three input terminals of the AND circuit 43 are all at a high level, that is, when the clutch is in an engaged state and simultaneously the engine rotational speed is higher than the particular speed N1, while at the same time the transmission is in a connected or power-transmitting state, the AND circuit 43 generates a high level output and applies same to the control terminal of the switching circuit 52 to bring same into the closed state, whereby the solenoid 33 of the solenoid controlled valve 32 is energized so that the spool 38 is displaced rightward as viewed in FIG. 8 to allow pressurized engine oil pumped from the oil pump 26 to be fed to the oil feeding passages 16a, 16a'. As a consequence, each of the back pressure chambers 18a, 18a' of the inlet and exhaust operating means A, A' is supplied with pressurized oil so that the piston 17 in each chamber is moved so as to drivingly connect the always operating rocker arm 15-1 with the disabling rocker arm 15-2 to thereby allow the engine to operate in the all valve operative state.

On the other hand, when the voltage applied to either one of the input terminals of the AND circuit 43 is at a low level, the AND circuit 43 generates a low level output and applies same to the control terminal of the switching circuit 52. Accordingly, the switching circuit 52 becomes open to cause deenergization of the solenoid 33 of the solenoid control valve 32 so that the spool 38 is moved leftward as viewed in FIG. 8, to thereby interrupt the supply of pressurized engine oil pumped from the oil pump 26 to the oil feeding passages 16a, 16a'. Consequently, the piston 17 is moved toward the always operating rocker arm 15-1 by the force of the spring 20 to release the always operating rocker arm 15-1 and the disabling rocker arm 15-2 from their driving coupling to allow the engine to operate in the partial valve inoperative state.

If a gear shifting operation is effected while the engine is operated in the all valve operative state, that is, while the AND circuit 43 has all its input terminals supplied with high level voltages, the transmission temporarily assumes its neutral position, and accordingly the neutral position switch 48 temporarily assumes an on position, so that the output from the AND circuit 43 temporarily goes low. If each time such temporary change in the control circuit take places in the high engine rotational speed region, the valve disabling device effects a changeover from the all valve operative state to the partial valve inoperative state, there can occur a sudden drop in the engine output, causing a mechanical shock upon the valve disabling device and component parts of the engine, which results in shortened lives of these components and even in degraded driveability of the vehicle. Therefore, according to the invention, the control circuit 34 of the valve disabling device is provided with the changeover temporary inhibit circuit 44 for temporarily holding the output voltage level from the AND circuit 43 unchanged, to thereby eliminate the above-mentioned disadvantage.

Figure 10:
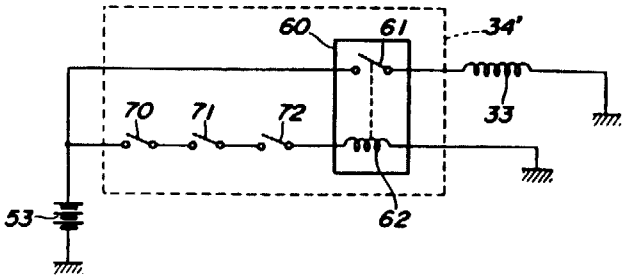
FIG. 10 is a schematic circuit diagram of a variation of the control circuit of FIG. 9.

FIG. 10 shows a variation of the control circuit of the valve disabling device. According to this modified control circuit 34', contacts 61 of a relay and the solenoid 33 of the solenoid controlled valve 32 are serially connected between the anode of the battery 53 and the ground, while in parallel with the contacts 61 and the solenoid 33, switches 70, 71 and 72 and a coil 62 of the relay 60 are serially connected between the anode of the battery 53 and the ground. The switch 70 may be formed e.g. by contacts of a normally open relay, and is adapted to be closed when the engine rotational speed is above the particular speed N1. The switches 71, 72 may be formed by the clutch switch 50 and the neutral switch 48 in FIG. 9, and these switches 71, 72 are adapted to be closed when the clutch assumes an engaged position, and when the transmission assumes a position other than the neutral position, respectively.

When all the switches 70, 71, 72 are closed and electric current from the battery 53 is applied to the coil 62 of the relay 60 at the same time, the contacts 61 of the relay 60 is closed to cause energization of the solenoid 33, whereas when the clutch is disengaged, or the transmission assumes its neutral position to interrupt power transmission, or the engine rotational speed is less than the particular speed N1, that is, at least one of the three switches 70, 71, and 72 is open, the supply of electric current to the coil 62 is interrupted to cause the contacts 61 to be open, whereby the solenoid 33 is deenergized.

In the above described manner, the energization of the solenoid 33 of the solenoid controlled valve 32 is controlled for changeover operation of the valve disabling device.

Figure 11:
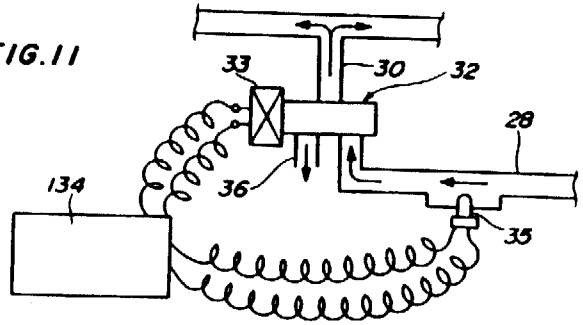
FIG. 11 is a schematic circuit diagram of an oil circuit of an operating oil supply control means of a valve disabling device according to a second embodiment of the invention.
Figure 12:
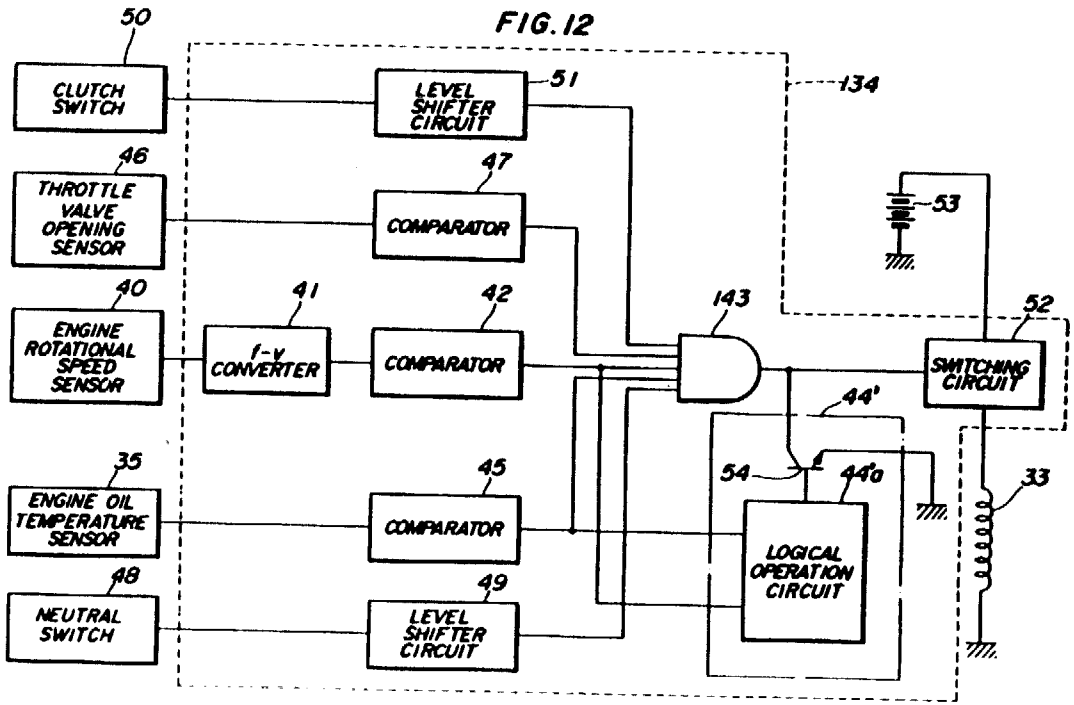
FIG. 12 is a schematic circuit diagram of an electrical control circuit of the valve disabling device according to the second embodiment of the invention.
Figure 13:
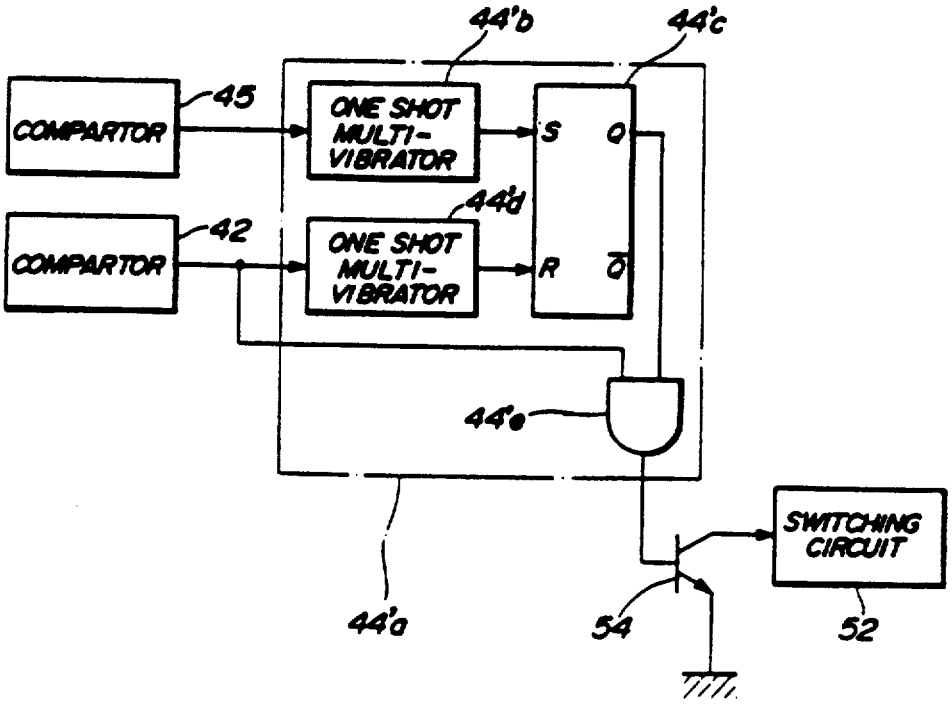
FIG. 13 is a circuit diagram of the circuit configuration of a logical operation circuit appearing in FIG. 12.

FIGS. 11 through 13 illustrate a second embodiment of the valve disabling device according to the invention. The device according to this second embodiment is characterized by its responsiveness to the engine rotational speed, the state of engagement or disengagement of the power transmission means, the engine oil temperature, and the throttle valve opening, for changeover of the states of the inlet valves 11 and exhaust valves 12 (FIG. 2). The device according to the second embodiment is distinguished from the first embodiment of FIGS. 2 through 10 previously described, in respect of the structures of the solenoid valve control circuit and the changeover temporary inhibit circuit, and also in that the control circuit is also responsive to outputs from a temperature sensor 35 and a throttle valve opening sensor 46, but in other respects is substantially identical with the latter. Therefore, parts or elements corresponding to those of the previous embodiments are designated by identical reference characters, and description thereof is omitted.

As shown in FIGS. 11 and 12, the solenoid valve control circuit 134 is electrically connected not only with the aforementioned engine rotational speed sensor 40, the neutral position switch 48, and the clutch switch 50, but also with the engine oil temperature sensor 35 and the throttle valve opening sensor 46. To be specific, the engine oil temperature sensor 35 has its output connected to the input of a comparator 45 which in turn has its output connected to a fourth input terminal of an AND circuit 143 which has first to third input terminals connected to respective ones of the comparator 42 and the level shifter units 49, 51. The output of the comparator 45 is also connected to a first input terminal of a changeover temporary inhibit circuit 44', which in turn has a second input terminal to which is connected the engine rotational speed sensor 40 by way of the f-V converter 41 and the comparator 42.

The temperature sensor 35 is mounted, for instance, on the coupling member D, and converts the temperature of engine oil as operating fluid of the valve disabling device into a corresponding voltage VT and applies same to the comparator 45. The comparator 45 compares this voltage VT with a predetermined voltage V2 corresponding to a predetermined value of the engine oil temperature, and when the relationship $VT \geqq V2$ stands, that is, when the engine oil temperature is above the predetermined value or the engine oil is low in viscosity, it applies a high level voltage to the AND circuit 143, whereas when the relationship $VT < V2$ holds, that is, when the engine oil temperature is below the predetermined value or the engine oil is high in viscosity such that the valve disabling device suffers from a large response lag, it applies a low level voltage to the AND circuit 143.

This engine oil temperature sensor 35 need not be a type of directly detecting the engine oil temperature. For instance, it may be formed by a sensor adapted to detect the temperature of the engine per se such as a cylinder or a cylinder head or a sensor adapted to detect the valve opening of a choke valve, the position of a choke lever, etc., from which an output signal is supplied to the comparator 45 as a function of the oil temperature.

The throttle valve opening sensor 46 has its output connected to the input of a comparator 47, the output of which is connected to a fifth input terminal of the AND circuit 143. The throttle valve opening sensor 46 converts the valve opening of the throttle valve into a corresponding voltage $V\theta$ and applies same to the comparator 47, which in turn compares the input voltage $V\theta$ with a predetermined voltage V3 corresponding to a predetermined value of the throttle valve opening (e.g. 1/12 times as large as the maximum valve opening). When the relationship $V\theta \geqq V3$ stands, that is, when the throttle valve opening is larger than the predetermined value, the comparator 47 applies a high level voltage to the AND circuit 143, whereas when the relationship $V\theta < V3$ stands, that is, when the throttle valve opening is smaller than the predetermined value or the absolute quantity of intake air is small, the comparator 47 applies a low level voltage to the AND circuit 143.

With the above arrangement, when the engine oil temperature is lower than the predetermined value, the output voltage from the AND circuit 143 remains at a low level even if the engine rotational speed rises above the particular speed N1. As the engine oil temperature rises above the predetermined value with warming-up of the engine, the output voltage from the AND circuit 143 goes high. However, in the event that the engine oil temperature rises above the predetermined value when the engine rotational speed is very high, a large shock can take place upon changeover of the valve disabling device from the partial valve inoperative state to the all valve operative state, attributable to a large difference in the engine output between the two states of the valves in a high rotational speed region of the engine, badly affecting the driveability of the vehicle and the durability of the valve disabling device and engine component parts. According to the invention, the second changeover temporary inhibit 44' operates to eliminate such inconvenience, in such a manner that while the engine rotational speed is above the particular speed N1, if the oil temperature exceeds the predetermined value for the first time, a logical operation circuit 44'a of the circuit 44' detects such state from the output signals from the comparators 42, 45, and applies a control signal to the base of a transistor 54 whose collector is connected to the junction of the output of the AND circuit 143 with the control terminal of the switching circuit 52 and emitter is grounded, to cause same to conduct, thereby rendering the voltage applied to the control terminal of the switching circuit 52 low in level. By virtue of the provision of the temporary inhibit circuit 44', in the event that the engine has been warmed up in a high rotational speed region, the valve disabling device is held in the partial valve inoperative state even after the completion of the warming-up of the engine, to inhibit changeover from the partial valve inoperative state to the all valve operative state. The second changeover inhibit circuit 44' is released from its inhibiting operation to inhibit changeover from the partial valve inoperative state to the all valve operative state when the engine rotational speed has dropped below the particular speed N1 after the engine has been warmed up, and thereafter, the changeover to the all valve operative state is effected when the engine rotational speed again rises above the particular speed N1.

As shown in detail in FIG. 13, the logical operation circuit 44'a of the changeover temporary inhibit circuit 44' comprises two one shot multivibrators 44'b, 44'd, an RS flip flop 44'c, and an AND circuit 44'e. The one shot multivibrator 44'b is triggered by the leading edge of an output signal from the comparator 45 upon rising from a low level to a high level when the engine oil temperature rises up to the predetermined value with warming-up of the engine, to apply a set pulse to a set pulse input terminal S of the flip flop 44'c. On the other hand, the one shot multivibrator 44'd is triggered by the trailing edge of an output signal from the comparator 42 upon breaking from a high level to a low level when the engine rotational speed drops below the particular speed N1 from a higher engine speed region, to apply a reset pulse to a reset pulse input terminal of the flip flop 44'c. The flip flop 44'c has its Q-output terminal connected to a first input terminal of the AND circuit 44'e, which in turn has a second input terminal connected to the output of the comparator 42, and its output connected to the base of the transistor 54. In the logical operation circuit 44'a constructed as above, when warming-up of the engine has been completed while the engine is operating in a high rotational speed region, a high level output is generated from the AND circuit 44'e immediately upon the completion of the warming-up, and applied to the transistor 54 to cause same to conduct, thereby allowing the valve disabling device to continually maintain the partial valve inoperative state. Afterwards, when the engine rotational speed drops below the particular speed N1, the Q-output signal from the flip flop 44'c is inverted from a high level to a low level to release the circuit 44' from its changeover inhibiting operation.

With the arrangement of FIG. 12, when all the conditions are satisfied, that is, when the clutch of the engine is in an engaged state, the throttle valve opening is above the predetermined value, the engine rotational speed is above the particular speed N1, the engine oil temperature is above the predetermined value, and the neutral position switch is in an off state, the AND circuit 143 has all its input terminals supplied with high level voltages to generate a high level output and apply same to the control terminal of the switching circuit 52. On the other hand, if any one of the input terminals of the AND circuit 143 is supplied with a low level input, the AND circuit 143 generates a low level output and applied same to the control terminal of the switching circuit 52. Thereafter, similar operations will be performed, to those described with respect to the first embodiment, description of which is therefore omitted.

Figure 14:
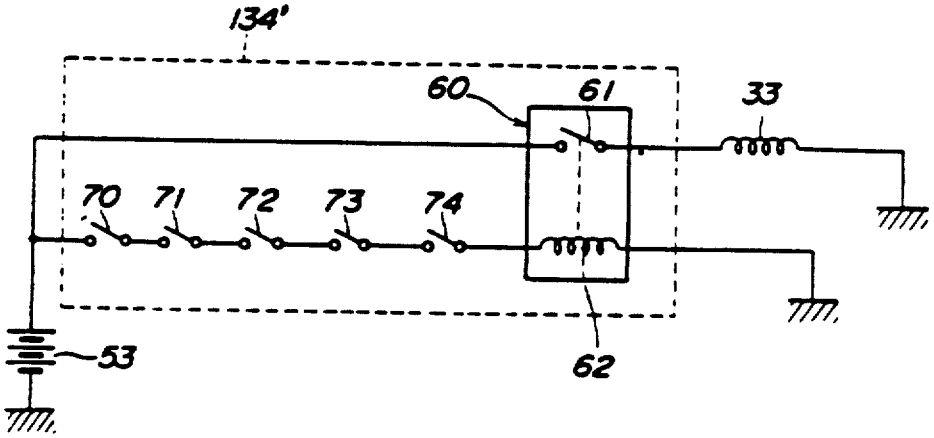
FIG. 14 is a view similar to FIG. 10, showing a variation of the circuit of FIG. 12.

FIG. 14 shows a variation of the control circuit 134 of the second embodiment appearing in FIGS. 11 through 13. The control circuit 134' of FIG. 14 has a similar construction to the control circuit 34' of FIG. 10, and as compared with the latter, it further includes switches 73 and 74 serially connected between the switch 72 and the relay coil 62 which both have their equivalents in the control circuit 34' of FIG. 10. The switch 73 may be formed by contacts of a normally open type relay driven by a driving circuit composed of a thermistor and a transistor, and is adapted to be closed when the engine oil temperature is above the predetermined value. The switch 74 may be formed by a mechanical switch operable in response to the throttle valve of the engine, and is adapted to be closed when the throttle valve opening is larger than the predetermined value. The operation of the control circuit 134' is basically similar to those of the control circuits 134, 34' of FIGS. 12, 10, as can be easily deduced from comparison between the figures, description of which is therefore omitted.

Although in the foregoing embodiments the changeover means of the valve disabling device is composed of a control means adapted to control the energization of the solenoid of a solenoid controlled valve, this is not limitative. The valve disabling device according to the invention may have another type changeover means insofar as it is operable in response to part or all of engine rotational speed, throttle valve opening, engine oil temperature, and state of engagement or disengagement of the power transmission means.

Although the operative state of the valve disabling device is changed in response to engine rotational speed and state of engagement or disengagement of the power transmission means in the first embodiment, and in response to throttle valve opening and engine oil temperature besides the above parameters in the second embodiment, respectively, these are not limitative, but other combinations of the four parameters can apply to changeover of the operative state of the valve disabling device, for instance, a combination of engine rotational speed and engine oil temperature, or a combination of engine rotational speed, engine oil temperature, and throttle valve opening.

Moreover, part or all of the predetermined or particular values of engine rotational speed, throttle valve opening, and engine oil temperature for determining whether to effect changeover of the operative state of the valve disabling device may be provided with hysteresis margins so as to make the changeover action more stable. For instance, the particular speed (e.g. 2000 rpm) N1 may be provided with a hysteresis margin of $\pm 100$ rpm such that when the engine rotational speed rises above 2100 rpm, a changeover occurs from the partial valve inoperative state to the all valve operative state, while when the engine rotational speed drops below 1900 rpm, a changeover occurs from the all valve operative state to the partial valve inoperative state. By providing a suitable hysteresis-imparting circuit in the control circuit 34, 134, it can be avoided that repeated changeover actions occur when the engine is operated at speeds in the vicinity of the particular speed N1 or 2000 rpm. The same results as this can be obtained by providing the predetermined value of engine oil temperature or throttle valve opening with a hysteresis margin.

What is claimed is:

1. A valve [disabling] *operation control* device for use in an internal combustion engine having inlet valve means, exhaust valve means, at least one of which comprises a plurality of valves, an output shaft, and power transmission means for selectively establishing and interrupting power transmission between said output shaft and a load on said engine, the device comprising:

[disabling] *valve operating* means for selectively holding said at least one of said inlet valve means and said exhaust valve means in a first state wherein part of said valves thereof are inoperative, and in a second state wherein all said valves thereof are operative for alternate closing and opening actions;

transmission state detecting means for detecting whether said power transmission means is in a connected state wherein said power transmission is allowed, or in a disconnected state wherein said power transmission is inhibited; and control means responsive to an output from said detecting means to cause said [disabling] *valve operating* means to hold said at least one of said inlet valve means and said exhaust valve means in said first state when said power transmission means is in said disconnected state, irrespective of the rotational speed of said engine.

2. A valve [disabling] *operation control* device as claimed in claim 1, including operating oil supply means, said [disabling] *valve operating* means being operable in response to the pressure of operating oil supplied from said operating oil supply means, engine speed sensor means for sensing the rotational speed of said engine, and temperature sensor means for sensing the temperature of said operating oil, and wherein said control means is responsive to an output from said engine speed sensor means and an output from said temperature sensor means for controlling the supply of said operating oil from said operating oil supply means to said [disabling] *valve operating* means in a manner such that when the rotational speed of said engine is higher than a predetermined value and the temperature of said operating oil is higher than a predetermined value at the same time, said [disabling] *valve operating* means holds said at least one of said inlet valve means and said exhaust valve means in said second state, while when the rotational speed of said engine is lower than said predetermined value thereof or the temperature of said operating oil is lower than said predetermined value thereof, said [disabling] *valve operating* means holds said at least one of said inlet valve means and said exhaust valve means in said first state.

3. A valve [disabling] *operation control* device as claimed in claim 1, including engine speed sensor means for sensing the rotational speed of said engine, and throttle valve opening sensor means for sensing the valve opening of a throttle valve of said engine, and wherein said control means is responsive to an output from said engine speed sensor means and an output from said throttle valve opening sensor for controlling said [disabling] *valve operating* means in a manner such that when the rotational speed of said engine is higher than a predetermined value and the valve opening of said throttle valve is larger than a predetermined value at the same time, said [disabling] *valve operating* means holds said at least one of said inlet valve means and said exhaust valve means in said second state, while when the rotational speed of said engine is lower than said predetermined value thereof or the valve opening of said throttle valve is smaller than said predetermined value thereof, said [] *valve operating* means holds said at least one of said inlet valve means and said exhaust valve means in said first state.

4. A valve [disabling] *operation control* device as claimed in claim 1, including engine speed sensor means for sensing the rotational speed of said engine, and wherein said control means is responsive to the output from said transmission state detecting means and an output from said engine speed sensor means for controlling said [disabling] *valve operating* means in a manner such that when said power transmission means is in said connected state and the rotational speed of said engine is higher than a predetermined value at the same time, said [disabling] *valve operating* means holds said at least one of said inlet valve means and said exhaust valve means in said second state, while when said power transmission means is in said disconnected state or the rotational speed of said engine is lower than said predetermined value, said [disabling] *valve operating* means holds said at least one of said inlet valve means and said exhaust valve means in said first state.

5. A valve [disabling] *operation control* device as claimed in claim 1, including operating oil supply means, said [disabling] *valve operating* means being operable in response to the pressure of operating oil supplied from said operating oil supply means, engine speed sensor means for sensing the rotational speed of said engine, temperature sensor means for sensing the temperature of said operating oil, and throttle valve opening sensor means for sensing the valve opening of a throttle valve of said engine, and wherein said control means is responsive to an output from said engine speed sensor means, an output from said temperature sensor means, and an output from said throttle valve opening sensor means, for controlling the supply of said operating oil from said operating oil supply means to said [disabling] *valve operating* means in a manner such that when the rotational speed of said engine is higher than a predetermined value, the temperature of said operating oil is higher than a predetermined value, and the valve opening of said throttle valve is larger than a predetermined value at the same time, said [disabling] *valve operating* means holds said at least one of said inlet valve means and said exhaust valve means in said second state, while when the rotational speed of said engine is lower than said predetermined value thereof, the temperature of said operating oil is lower than said predetermined value thereof, or the valve opening of said throttle valve is smaller than said predetermined value thereof, said [disabling] *valve operating* means holds said at least one of said inlet valve means and said exhaust valve means in said first state.

6. A valve [disabling] *operation control* device as claimed in claim 1, including engine speed sensor means for sensing the rotational speed of said engine, and throttle valve opening sensor means for sensing the valve opening of a throttle valve of said engine, and wherein said control means is responsive to an output from said engine speed sensor means, an output from said throttle valve opening sensor, and the output from said transmission state detecting means for controlling said [disabling] *valve operating* means in a manner such that when the rotational speed of said engine is higher than a predetermined value, the valve opening of said throttle valve is larger than a predetermined value, and said power transmission means is in said connected state at the same time, said [disabling] *valve operating* means holds said at least one of said inlet valve means and said exhaust valve means in said second state, while when the rotational speed of said engine is lower than said predetermined value thereof, the valve opening of said throttle valve is smaller than said predetermined value thereof, or said power transmission means is in said disconnected state, said [disabling] *valve operating* means holds said at least one of said inlet valve means and said exhaust valve means in said first state.

7. A valve [disabling] *operation control* device as claimed in claim 1, including operating oil supply means, said [disabling] *valve operating* means being operable in response to the pressure of operating oil supplied from said operating oil supply means, engine speed sensor means for sensing the rotational speed of said engine, temperature sensor means for sensing the temperature of said operating oil, and throttle valve opening sensor means for sensing the valve opening of a throttle valve of said engine, and wherein said control means is responsive to the output from said transmission state detecting means, an output from said engine speed sensor means, an output from said temperature sensor means, and an output from said throttle valve opening sensor means for controlling the supply of said operating oil from said operating oil supply means to said [disabling] *valve operating* means in a manner such that when the rotational speed of said engine is higher than a predetermined value, the temperature of said operating oil is higher than a predetermined value, the valve opening of said throttle valve is larger than a predetermined value, and said power transmission means is in said connected state, at the same time, said [disabling] *valve operating* means holds said at least one of said inlet valve means and said exhaust valve means in said second state, while when the rotational speed of said engine is lower than said predetermined value thereof, the temperature of said operating oil is lower than said predetermined value thereof, the valve opening of said throttle valve is smaller than said predetermined value thereof, or said power transmission means is in said disconnected state, said [disabling] *valve operating* means holds said at least one of said inlet valve means and said exhaust valve means in said first state.

8. A valve [disabling] *operation control* device as claimed in claim 1, wherein said power transmission means comprises a transmission disposed such that said power transmission is interrupted when said transmission assumes a neutral position, and a clutch disposed such that said power transmission is interrupted when said clutch is in a disengaged state, said transmission state detecting means comprising a neutral position switch for generating a signal indicative of whether said transmission assumes said neutral position thereof, and a clutch switch for generating a signal indicative of whether said clutch is in said disconnected state.

9. A valve [disabling] *operation control* device as claimed in any of claims 2, 5 or 7, wherein said predetermined value of said temperature of said operating oil is set at such a value that when the temperature of said operating oil is lower than said predetermined value thereof, a change over between said first state and said second state by said [disabling] *valve operating* means can take place at a value of the rotational speed of said engine substantially different from said predetermined value of the rotational speed of said engine.

10. A valve [disabling] *operation control* device as claimed in any of claims 3, 5, 6, or 7, wherein said predetermined value of the valve opening of said throttle valve is set at such a value that said engine can produce a larger output when said [disabling] *valve operating* means holds said at least one of said inlet valve means and said exhaust valve means in said first state than when said disabling means holds said at least one of said inlet valve means and said exhaust valve means in said second state, irrespective of the rotational speed of said engine.

11. A valve [disabling] *operation control* device as claimed in any of claims 2–7, wherein said predetermined value of the rotational speed of said engine is set at such a value that when the rotational speed of said engine is lower than said predetermined value thereof, said engine can produce a larger output when said [disabling] *valve operating* means holds said at least one of said inlet valve means and said exhaust valve means in said first state than when said [disabling] *valve operating* means holds said at least one of said inlet valve means and said exhaust valve means in said second state.

12. A valve [disabling] *operation control* device as claimed in claim 1, wherein said control means includes changeover temporary inhibiting means operable to cause said control means to respond to a change in the output from said transmission state detecting means corresponding to a changeover of said power transmission means from said connected state to said disconnected state, with a predetermined time delay set at a value larger than a period of time for which said transmission temporarily assumes said neutral position and also larger than a period of time for which said clutch is temporarily held in said disengaged state, when said [disabling] *valve operating* means holds said at least one of said inlet valve means and said exhaust valve means in said second state.

13. A valve [disabling] *operation control* device as claimed in claim 2, wherein said control means includes a second changeover temporary inhibiting means operable to cause said [disabling] *valve operating* means to continually hold said at least one of said inlet valve means and said exhaust valve means in said first state even if the temperature of said operating oil changes from a value lower than said predetermined value thereof to a value higher than the latter, when the rotational speed of said engine is higher than said predetermined value thereof, and to cause said [disabling] *valve operating* means to hold said at least one of said inlet valve means and said exhaust valve means in said second state only after the rotational speed of said engine rises above said predetermined value thereof after dropping below the latter.

14. A valve [disabling] *operation control* device as claimed in claim 1, wherein said engine includes a rotatable camshaft formed with an inlet cam and an exhaust cam, a pair of inlet and exhaust rocker arm shafts, and a pair of inlet and exhaust rocker arms journalled by respective ones of said inlet and exhaust rocker arm shafts for causing alternate closing and opening actions of respective ones of said inlet valve means and said exhaust valve means, said [disabling] *valve operating* means comprising one of said rocker arms corresponding to said at least one of said inlet valve means and said exhaust valve means, said one of said rocker arms comprising a disabling rocker arm corresponding to part of said at least one of said inlet valve means and said exhaust valve means, and a normally operating rocker arm corresponding to the remainder of said at least one of said inlet valve means and said exhaust valve means and disposed in slidable contact with a corresponding one of said inlet cam and said exhaust cam in a manner selectively drivingly connectible with or disconnectible from said disabling rocker arm, selecting means for selectively causing driving connection or disconnection between said disabling rocker arm and said normally operating rocker arm, whereby when disconnected from said normally operating rocker arm, said disabling rocker arm holds said part of said at least one of said inlet valve means and said exhaust valve means in a closed position thereof.

15. A valve [disabling] *operation control* device as claimed in claim 14, wherein said disabling rocker arm and said normally operating rocker arm have continuous guide bores, said selecting means having a piston slidably disposed within said guide bores, said piston being disposed to selectively assume a first position wherein it holds said rocker arms drivingly connected together, and a second position wherein it holds said rocker arms disconnected from each other, said control means comprising operating oil supply means, oil feeding passage means connecting said operating oil supply means with a back pressure chamber defined by a portion of said guide bores and said piston, valve means selectively establishing or interrupting communication between said operating oil supply means and said back pressure chamber, whereby when said communication between said operating oil supply means and said back pressure chamber is established by said valve means, operating oil is supplied to said back pressure chamber to thereby cause said piston to assume said first position, while said communication between said operating oil supply means and said back pressure chamber is interrupted by said valve means, the supply of operating oil to said back pressure chamber is interrupted to cause said piston to assume said second position.

16. A valve [disabling] *operation control* device as claimed in claim 1, wherein said load on said engine comprises driving wheels of a vehicle in which said engine is installed.

*17. A valve operation control device for use in an internal combustion engine having inlet valve means, exhaust valve means, at least one of which comprises a plurality of valves, an output shaft, and power transmission means for selectively establishing and interrupting power transmission between said output shaft and a load on said engine, the device comprising:*

*valve operating means for selectively holding said at least one of said inlet valve means and said exhaust valve means in a first state wherein the operation of said valves presents less than the total sectional area available for gas flow through said valves for engine operation and in a second state wherein the operation of said valves presents the total sectional area available for gas flow through said valves for engine operation;*

*transmission state detecting means for detecting whether said power transmission means is in a connected state wherein said power transmission is allowed, or in a disconnected state wherein said power transmission is inhibited; and*

*control means responsive to an output from said detecting means to cause said valve operating means to hold said at least one of said inlet valve means and said exhaust valve means in said first state when said power transmission means is in said disconnected state, irrespective of the rotational speed of said engine.*

*18. A valve operation control device as claimed in claim 17, including operating oil supply means, said valve operating means being operable in response to the pressure of operating oil supplied from said operating oil supply means, engine speed sensor means for sensing the rotational speed of said engine, and temperature sensor means for sensing the temperature of said operating oil, and wherein said control means is responsive to an output from said engine speed sensor means and an output from said temperature sensor means for controlling the supply of said operating oil from said operating oil supply means to said valve operating means in a manner such that when the rotational speed of said engine is higher than a predetermined value and the temperature of said operating oil is higher than a predetermined value at the same time, said valve operating means holds said at least one of said inlet valve means and said exhaust valve means in said second state, while when the rotational speed of said engine is lower than said predetermined value thereof or the temperature of said operating oil is lower than said predetermined value thereof, said valve*

*operating means holds said at least one of said inlet valve means and said exhaust valve means in said first state.*

*19. A valve operation control device as claimed in claim 17, including engine speed sensor means for sensing the rotational speed of said engine, and throttle valve opening sensor means for sensing the valve opening of a throttle valve of said engine, and wherein said control means is responsive to an output from said engine speed sensor means and an output from said throttle valve opening sensor for controlling said valve operating means in a manner such that when the rotational speed of said engine is higher than a predetermined value and the valve opening of said throttle valve is larger than a predetermined value at the same time, said valve operating means holds at least one of said inlet valve means and said exhaust valve means in said second state, while when the rotational speed of said engine is lower than said predetermined value thereof or the valve opening of said throttle valve is smaller than said predetermined value thereof, said valve operating means holds said at least one of said inlet valve means and said exhaust valve means in said first state.*

*20. A valve operation control device as claimed in claim 17, including engine speed sensor means for sensing the rotational speed of said engine, and wherein said control means is responsive to the output from said transmission state detecting means and an output from said engine speed sensor means for controlling said valve operating means in a manner such that when said power transmission means is in said connected state and the rotational speed of said engine is higher than a predetermined value at the same time, said valve operating means holds said at least one of said inlet valve means and said exhaust valve means in said second state, while when said power transmission means is in said disconnected state of the rotational speed of said engine is lower than said predetermined value, said valve operation means holds said at least one of said inlet valve means and said exhaust valve means in said first state.*

*21. A valve operation control device as claimed in claim 17, including operating oil supply means, said valve operating means being operable in response to the pressure of operating oil supplied from said operating oil supply means, engine speed sensor means for sensing the rotational speed of said engine, temperature sensor means for sensing the temperature of said operating oil, and throttle valve opening sensor means for sensing the valve opening of a throttle valve of said engine, and wherein said control means is responsive to an output from said engine speed sensor means, an output from said temperature sensor means, and an output from said throttle valve opening sensor means, for controlling the supply of said operating oil from said operating oil supply means to said valve operating means in a manner such that when the rotational speed of said engine is higher than a predetermined value, the temperature of said operating oil is higher than a predetermined value, and the valve opening of said throttle valve is larger than a predetermined value at the same time, said valve operating means holds said at least one of said inlet valve means and said exhaust valve means in said second state, while when the rotational speed of said engine is lower than said predetermined value thereof, the temperature of said operating oil is lower than said predetermined value thereof, of the valve opening of said throttle valve is smaller than said predetermined value thereof, said valve operating means holds said at least one of said inlet valve means and said exhaust valve means in said first state.*

*22. A valve operation control device as claimed in claim 17, including engine speed sensor means for sensing the rotational speed of said engine, and throttle valve opening sensor means for sensing the valve opening of a throttle valve of said engine, and wherein said control means is responsive to an output from said engine speed sensor means, an output from said throttle valve opening sensor, and the output from said transmission state detecting means for controlling said valve operating means in a manner such that when the rotational speed of said engine is higher than a predetermined value, the valve opening of said throttle valve is larger than a predetermined value, and said power transmission means is in said connected state at the same time, said valve operating means holds said at least one of said inlet valve means and said exhaust valve means in said second state, while when the rotational speed of said engine is lower than said predetermined value thereof, the valve opening of said throttle is smaller than said predetermined value thereof, or said power transmission means is in said disconnected state, said valve operating means holds said at least one of said inlet valve means and said exhaust valve means in said first state.*

*23. A valve operation control device as claimed in claim 17, including operating oil supply means, said valve operating means being operable in response to the pressure of operating oil supplied from said operating oil supply means, engine speed sensor means for sensing the rotational speed of said engine, temperature sensor means for sensing the temperature of said operating oil, and throttle valve opening sensor means for sensing the valve opening of a throttle valve of said engine, and wherein said control means is responsive to the output from said transmission state detecting means, and output from said engine speed sensor means, an output from said temperature sensor means, and an output from said throttle valve opening sensor means for controlling the supply of said operating oil from said operating oil supply means to said valve operating means in a manner such that when the rotational speed of said engine is higher than a predetermined value, the temperature of said operating oil is higher than a predetermined value, the valve opening of said throttle valve is larger than a predetermined value, and said power transmission means is in said connected state, at the same time, said valve operating means holds said at least one of said inlet valve means and said exhaust valve means in said second state, while when the rotational speed of said engine is lower than said predetermined value thereof, the temperature of said operating oil is lower than said predetermined value thereof, the valve opening of said throttle valve is smaller than said predetermined value thereof, or said power transmission means is in said disconnected state, said valve operating means holds said at least one of said inlet valve means and said exhaust valve means in said first state.*

*24. A valve operation control device as claimed in claim 17, wherein said power transmission means comprises a transmission disposed such that said power transmission is interrupted when said transmission assumes a neutral position, and a clutch disposed such that said power transmission is interrupted when said clutch is in a disengaged state, said transmission state detecting means comprising a neutral position switch for generating a signal indicative of whether said transmission assumes said neutral position thereof, and a clutch switch for generating a signal indicative of whether said clutch is in said disconnected state.*

*25. A valve operation control device as claimed in any of claims 18, 21 or 23, wherein said predetermined value of said temperature of said operating oil is set at such a value that when the temperature of said operating oil is lower than said predetermined value thereof, a change over between said first state and said second state by said valve*

*operating means can take place at a value of the rotational speed of said engine substantially different from said predetermined value of the rotational speed of said engine.*

*26. A valve operation control device as claimed in any of claims 19, 21, 22 or 23, wherein said predetermined value of the valve opening of said throttle valve is set at such a value that said engine can produce a larger output when said valve operating means holds at least one of said inlet valve means and said exhaust valve means in said first state than when said disabling means holds said at least one of said inlet valve means and said exhaust valve means in said second state, irrespective of the rotational speed of said engine.*

*27. A valve operation control device as claimed in any of claims 18 through 23, wherein said predetermined value of the rotational speed of said engine is set at such a value that when the rotational speed of said engine is lower than said predetermined value thereof, said engine can produce a larger output when said valve operating means holds said at least one of said inlet valve means and said exhaust valve means in said first state that when said valve operating means holds said at least one of said inlet valve means and said exhaust valve means in said second state.*

*28. A valve operation control device as claimed in claim 17, wherein said control means includes changeover temporary inhibiting means operable to cause said control means to respond to a change in the output from said transmission state detecting means corresponding to a changeover of said power transmission means from said connected state to said disconnected state, with a predetermined time delay set at a value larger than a period of time for which said transmission temporarily assumes said neutral position and also larger than a period of time for which said clutch is temporarily held in said disengaged state, when said valve operating means holds said at least one of said inlet valve means and said exhaust valve means in said second state.*

*29. A valve operation control device as claimed in claim 18, wherein said control means includes a second changeover temporary inhibiting means operable to cause said valve operating means to continually hold said at least one of said inlet valve means and said exhaust valve means in said first state even if the temperature of said operating oil changes from a value lower than said predetermined value thereof to a value higher than the latter, when the rotational speed of said engine is higher than said predetermined value thereof, and to cause said valve operating means to hold said at least one of said inlet valve means and said exhaust valve means in said second state only after the rotational speed of said engine rises above said predetermined value thereof after dropping below the latter.*

*30. A valve operation control device as claimed in claim 17, wherein said engine includes a rotatable camshaft formed with an inlet cam and an exhaust cam, a pair of inlet and exhaust rocker arm shafts, and a pair of inlet and exhaust rocker arms journalled by respective ones of said inlet and exhaust rocker arm shafts for causing alternate closing and opening actions of respective ones of said inlet valve means and said exhaust valve means, said valve operating means comprising one of said rocker arms corresponding to said at least one of said inlet valve means and said exhaust valve means, said one of said rocker arms comprising a disabling rocker arm corresponding to part of said at least one of said inlet valve means and said exhaust valve means, and a normally operating rocker arm corresponding to the remainder of said at least one of said inlet valve means and said exhaust valve means and disposed in slidable contact with a corresponding one of said inlet cam and exhaust cam in a manner selectively drivingly connectible with or disconnectible from said disabling rocker arm, selecting means for selectively causing driving connection or disconnection between said disabling rocker arm and said normally operating rocker arm, whereby when disconnected from said normally operating rocker arm, said disabling rocker arm holds said part of said at least one of said inlet valve means and said exhaust valve means in a closed position thereof.*

*31. A valve operation control device as claimed in claim 30, wherein said disabling rocker arm and said normally operating rocker arm have continuous guide bores, said selecting means having a piston slidably disposed within said guide bores, said piston being disposed to selectively assume a first position wherein it holds said rocker arms drivingly connected together, and a second position wherein it holds said rocker arms disconnected from each other, said control means comprising operating oil supply means, oil feeding passage means connecting said operating oil supply means with a back pressure chamber defined by a portion of said guide bores and said piston, valve means selectively establishing or interrupting communication between said operating oil supply means and said back pressure chamber, whereby when said communication between said operating oil supply means and said back pressure chamber is established by said valve means, operating oil is supplied to said back pressure chamber to thereby cause said piston to assume said first position, while said communication between said operating oil supply means and said back pressure chamber is interrupted by said valve means, the supply of operating oil to said back pressure chamber is interrupted to cause said piston to assume said second position.*

*32. A valve operation control device as claimed in claim 17, wherein said load on said engine comprises driving wheels of a vehicle in which said engine is installed.*

* * * * *